United States Patent [19]

Hobday et al.

[11] 3,967,924
[45] July 6, 1976

[54] COMPOSITION FOR USE IN THE DYEING OF POLYESTER FIBERS

[75] Inventors: Cyril Hobday, Manchester; Ian Michael Price, Glossop, both of England

[73] Assignee: Ciba-Geigy Corporation, Ardsley, N.Y.

[22] Filed: Jan. 22, 1975

[21] Appl. No.: 543,098

[30] Foreign Application Priority Data

Jan. 23, 1974 United Kingdom............... 3042/74
Aug. 8, 1974 United Kingdom............. 35060/74

[52] U.S. Cl............................ 8/169; 8/173; 8/41 C; 8/174; 8/179
[51] Int. Cl.² ............................................ D06P 5/04
[58] Field of Search...................... 8/169, 173, 174

[56] References Cited
UNITED STATES PATENTS

| | | | |
|---|---|---|---|
| 2,014,782 | 9/1935 | Schrauth et al.................. | 260/99.12 |
| 2,567,645 | 9/1951 | Limburg............................ | 252/121 |
| 2,572,892 | 10/1951 | Swern et al........................ | 260/406 |
| 3,736,096 | 5/1973 | Nichols et al..................... | 8/62 |
| B283,300 | 1/1975 | Boehmke.......................... | 8/169 |

FOREIGN PATENTS OR APPLICATIONS

| | | |
|---|---|---|
| 1,001,966 | 2/1957 | Germany |
| 2,256,116 | 5/1974 | Germany |
| 1,328,107 | 8/1973 | United Kingdom |
| 1,021,806 | 3/1966 | United Kingdom |
| 925,859 | 5/1963 | United Kingdom |

OTHER PUBLICATIONS

Surfactants in Ciba–Geigy Review, 1971, No. 2, pp. 3–38.
B283,300, Jan. 1975, Boehmke 8/169.

*Primary Examiner*—Joseph L. Schofer
*Assistant Examiner*—A. L. Clingman
*Attorney, Agent, or Firm*—Joseph G. Kolodny; Edward McC. Roberts; Prabodh I. Almaula

[57] ABSTRACT

A new non-foaming composition which is useful for a substantially crease-free dyeing of polyester fibers and comprises a dyeing assistant and a surface-active glyceride.

10 Claims, No Drawings

COMPOSITION FOR USE IN THE DYEING OF POLYESTER FIBERS

The present invention relates to the dyeing of polyester fibres with disperse dyes.

It is well known to dye polyester fibres in the presence of a dyeing assistant/carrier at temperatures from 115°C. to 140°C. The dyeing assistants are usually water insoluble compounds which are formulated in emulsion form.

In certain dyeing machines, notably the non-fully flooded jet type, it is advisable and sometimes necessary to produce the dyeing assistants in a non-foaming formulation.

However, it is found that when dyeing certain types of polyester fabric structures in such machines at temperatures necessary to give full colour yields, levelness and freedom from barriness (especially with dyes of high sublimation fastness) the polyester fabrics exhibit creasing and the dyeing process is therefore unsatisfactory.

Surprisingly, we have found that if a dyeing assistant is used in conjunction with certain surface-active glycerides to make a non-foaming formulation, then the creasing is minimised or even completely prevented.

Accordingly, the present invention provides a composition for use in the dyeing of polyester fibres which comprises a non-foaming formulation comprising a dyeing assistant and a surface-active glyceride.

The present invention also provides a process for the crease-free dyeing of polyester fibres which comprises contacting the fibres with a disperse dye in the presence of a non-foaming composition comprising a dyeing assistant and a surface-active glyceride.

The surface-active glyceride of the invention is prepared by oxidation of a polyunsaturated oil, preferably with air, at elevated temperatures, followed by treatment with an alkali metal salt of an oxyacid of sulphur, especially an alkali metal salt of sulphurous acid, for example sodium bisulphite or sodium metabisulphite.

The polyunsaturated oil consists of easily oxidisable fatty glycerides containing components with as many as three double bonds per aliphatic chain of between 16 and 26 carbons. Suitable oils are oiticica oil, tung oil, china wood oil, and particularly oils derived from aquatic flora and fauna, especially fish oils. Suitable fish oils include herring oil, cod oil, cod liver oil, shark oil, sardine oil, mackerel oil and tuna oil. Although the composition of these fish oils varies, in general they are composed of triglycerides of the following acids in percentages with herring oil shown as an example:

| Saturated acids | General | Herring |
|---|---|---|
| $C_{14}$ | 2 – 8 | 8.0 |
| $C_{16}$ | 10 – 19 | 12.0 |
| $C_{18}$ | 0.1 – 5 | 1.0 |

| Unsaturated acids | General | Herring |
|---|---|---|
| $C_{14}$ | 0.1 – 2 | 0.5 |
| $C_{16}$ | 4 – 16 | 6.5 |
| $C_{18}$ | 16 – 38 | 21.0 |
| $C_{20}$ | 15 – 30 | 28.0 |
| $C_{22}$ | 10 – 27 | 23.0 |

Cod liver oil is similar, but in general is derived from triglycerides of the following acids:

| Saturated acids | Amount % |
|---|---|
| $C_{14}$ | 3.5 – 6 |
| $C_{16}$ | 6.5 – 11 |
| $C_{18}$ | 1 |
| Unsaturated acids | |
| $C_{14}$ | 0 – 0.5 |
| $C_{16}$ | 10 – 20 |
| $C_{18}$ | 25 – 31 |
| $C_{20}$ | 25 – 31.5 |
| $C_{22}$ | 10 – 20 |

Optionally small amounts of emulsifiers and/or antifoam agents, e.g. in amounts of 1% to 10% by weight, may be added to the surface-active glyceride. Examples of antifoam agents include silicone emulsions, for example a 5 to 10% by weight aqueous silicone emulsion which can also be used combined with higher alcohols of 4 to 22 carbon atoms, especially 2-ethyl-hexanol. Suitable antifoam agents are also alkylene oxide adducts of alcohols having from 4 to 22 carbon atoms, for example the adduct of stearyl alcohol and 1 mol of ethylene oxide, and esters of aliphatic dicarboxylic acids and said alcohols, especially di(ethyl-hexyl) adipate.

The dyeing assistants used in the composition of the invention are selected from those used in dyeing polyester at high temperature such as monochloro-o-phenylphenol, o-phenylphenol, diphenyl, methyl salicylate, methylnaphthalene, halogenated and/or alkylated phenoxyacetates, halogenated or alkylated phenoxyalkyl acetates, methyl cresotinate, halogenated benzenes, butyl benzoate, diethyl phthalate, diallyl phthalate, N-alkylphthalimides, p-phenylphenol and benzaldehyde. The dyeing assistant may also be selected from those disclosed in British Patent Specification No. 1 328 107 or in our co-pending British patent application No. 3042/74, but the dyeing assistant is preferably a phenoxyalkanol, especially phenoxyethanol or phenoxypropanol, where the aromatic ring is substituted by one or two chlorine atoms such as 2,4-dichlorophenoxypropanol.

The amount of surface-active glyceride in the composition of the invention may be from 20 % – 80 % by weight of the formulated product, but is preferably from 40% – 70 %.

The ingredients of the composition are preferably mixed together at an elevated temperature, e.g. from 40° to 80°C, preferably about 60°C, and the resulting mixture is then allowed to cool.

The disperse dye that is used in the process of the invention may be, for example, an azo, anthraquinone, nitro, methine, styrene, azostyrene, nitro-acridone, coumarin, naphthoperinone, quinaphthalone, or naphthoquinone imine dyestuff.

The amount of dye that is used in the liquor will depend upon the circumstances, and may be an amount up to 10 % by weight based on the weight of fibre to be dyed.

The process according to the present invention may be carried out batchwise, in which case the composition of the invention may be added directly to the dye-bath. The temperature at which the dyeing is carried out will normally be 115° – 140°C and the duration of dyeing will depend on circumstances, but generally a period of up to 2 hours will suffice.

The amount of the composition of the invention used in the aqueous dye liquor in a batch process may be within the range of from 0.01 to 0.6%, preferably from 0.05 to 0.3% by volume based on the total volume of the aqueous dye liquor.

The dyeing may, if desired, be completed by transferring the fibre to a separate bath where it undergoes a reduction clearing process to remove the surface dye. The fibre may afterwards be rinsed and dried.

The dyeing process is particularly suitable for use with woven/knitted fabrics, and in addition to fibres made entirely of polyester, particularly polyethylene terephthalate, the dyeing process of the invention may be carried out on blends of fibres containing polyester together with other fibres, such as natural or synthetic cellulosic or polyamide fibres.

The invention will be illustrated by reference to the following Examples. Percentages are expressed by weight.

EXAMPLE 1

Preparation of dyeing assistant composition 497.5 g of a commercial oxidised and sulphited fish oil was stirred with 2.5 g of a commercial cetyl alcohol ethoxylate, 5 g of a commercial 10% emulsion of a fluid poly (dimethyl siloxane) oil and 250 g 1-(2,4-dichlorophenoxy)-propan-2-ol at 60°C for 15 minutes and allowed to cool.

EXAMPLE 2

An aqueous dyebath was prepared containing:

| | |
|---|---|
| 0.23 % Disperse Red 11 | C.I. 62015 |
| 0.13 % Disperse Orange 1 | C.I. 11080 |
| 0.64 % Disperse Yellow 9 | C.I. 10375 |
| 0.22 % Disperse Blue 24 | C.I. 61515 |

0.5 g/l 1-(2,4-dichlorophenoxy)-propan-2-ol
1.5 g/l oxidised and sulphited fish oil
acetic acid to pH 5

Texturised polyester knitted jersey pique was dyed with the above dyebath in a non-fully flooded Jet Machine at 125°C for 1 hour. It was then slowly cooled to 80°C. The material was then rinsed, dried and set. No crease marks were observed.

Comparison

Another sample of the same material was dyed as described above, except that the dyebath did not contain any oxidised and sulphited fish oil. On final examination of the material, marked creasing was observed.

EXAMPLE 3

The procedure set forth in Example 2 was repeated on a non-fully flooded Jet Machine, using a dyebath containing:

| | |
|---|---|
| 2.8 % Disperse Blue 24 | C.I. 61515 |
| 1.85% Disperse Yellow 23 | C.I. 26070 |

0.5 g/l 1-(2,4-dichlorophenoxy)-propane-2-ol
1.5 g/l oxidised and sulphited fish oil
acetic acid to pH 5.5

No crease marks were observed on the material.

Comparison

Another sample of the same material was dyed as above, except that the dyebath did not contain any oxidised and sulphited fish oil. On final examination of the material, marked creasing was observed.

EXAMPLE 4

An aqueous dyebath was prepared containing

| | |
|---|---|
| 0.23 % Disperse Red 11 | C.I. 62015 |
| 0.13 % Disperse Orange 1 | C.I. 11080 |
| 0.64 % Disperse Yellow 9 | C.I. 10375 |
| 0.22 % Disperse Blue 24 | C.I. 61515 |

2 g/l product prepared as is Example 1
acetic acid to pH 5

Texturised polyester knitted jersey pique was dyed with the above dyebath in a non-fully flooded Jet Machine at 125°C for 1 hour. It was then slowly cooled to 80°C. The material was then rinsed, dried and set. No crease marks were observed.

Comparison

Another sample of the same material was dyed as described above, except that the dyebath did not contain any oxidised and sulphited fish oil. On final examination of the material, marked creasing was observed.

EXAMPLE 5

284 kgs of a knitted polyester twill fabric were dyed on a 3 tube non-fully flooded Jet Machine, liquor capacity 3,000 liters.

The aqueous dyebath was prepared containing: 2,85 % Disperse Red 60 C.I. 60756

0.69 % of a disperse dye of the formula

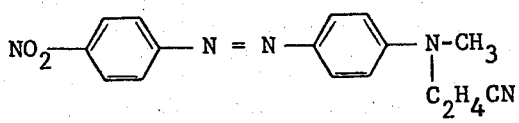

0.034 % of a disperse dye of the formula

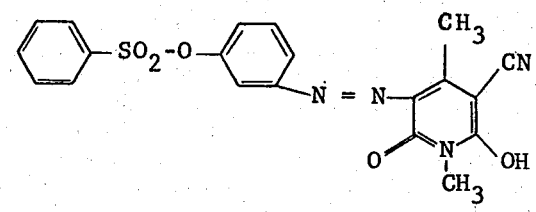

2 g/l product as prepared in Example 1 acetic acid to pH 5.5

The fabric was given a prerinse at 40°C before dyeing. The dyeing assistant and acid were added at 40°C and the predispersed dye at 60°C. The temperature was raised to 125°C and maintained there for 30 minutes. The batch was cooled slowly to 80°C and then rinsed. This was followed by a reduction clear treatment in an dyebath containing:

| | |
|---|---|
| 5 g/l | Sodium hydroxide solution 70°Tw |
| 2 g/l | Sodium Dithionite |
| 1 g/l | ethylene oxide condensate of stearyldiethylenetriamine. |

The fabric was treated for 20 minutes at 70°C, and was afterwards rinsed in water, dried, and set. No crease marks were observed.

Comparison a similar trial was carried out on the same quality material, but omitting the dyeing assistant described in Example 1. The fabric showed a marked amount of creasing.

EXAMPLE 6

340 kgs knitted texturised polyester pique were dyed on a 4 tube non-fully flooded Jet Machine, liquor capacity, 3,500 liters.

The aqueous dyebath was prepared containing:
1.86 % of a disperse dye of the formula

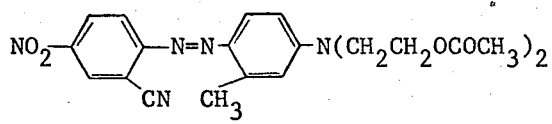

0.18 % of a disperse dye of the formula

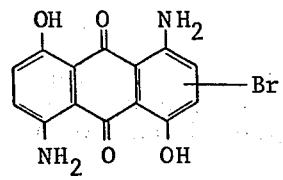

0.26 % Disperse Yellow 23 C.I. 26070

2 g/l product as prepared in Example 1 acetic acid to pH 5.5

The trial was carried out in a similar manner to the previous example except that the temperature was maintained at 125°C for 1 hour.

Again no crease marks were observed.

Comparison

Again a similar trial was carried out on some identical material, but omitting the dyeing assistant described in Example 1. The fabric showed a marked amount of creasing.

EXAMPLE 7

517 kgs of a knitted polyester fabric were dyed on a 6 tube non-fully flooded Jet Machine, liquor capacity 5,000 liters.

The aqueous dyebath was prepared containing 0.51% of a disperse dye of the formula

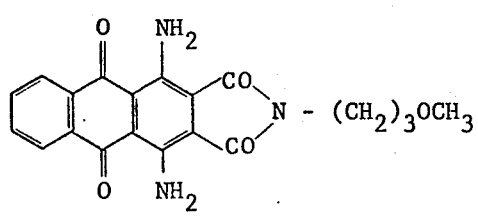

0.026 % of a disperse dye of the formula

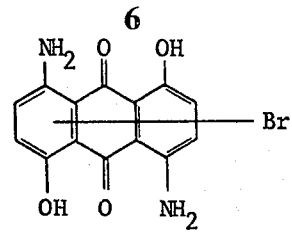

1.5 g/l product prepared as in Example 1 formic acid to pH 5.5

The dyeing assistant and acid were added at 40°C and the predispersed dye at 55°C. The temperature was raised to 130°C at 1°C/minute and maintained there for 30 minutes. The batch was cooled slowly to 85°C, and then rinsed.

On removal from the machine the material was substantially crease free. The fabric was dried and subsequently given a heat setting treatment. No crease marks were observed.

Comparison

A similar trial was carried out on the same quality material, but omitting the dyeing assistant described in Example 1.

On removal from the machine the fabric was considerably creased. The fabric was dried and given a similar heat setting treatment as before. Crease marks were apparent on examining the fabric.

We claim:

1. A composition for use in the substantially crease-free dyeing of polyester fibres, said composition comprising a dyeing assistant, which is a phenoxy alkanol where the benzene ring is substituted by one or two chlorine atoms and a surface-active glyceride which is one produced by oxidation of a polyunsaturated oil followed by treatment with an alkali metal salt of an oxyacid of sulphur.

2. A composition as claimed in claim 1, in which the amount of surface-active glyceride is from 20 to 80% by weight, based on the weight of the composition.

3. A composition as claimed in claim 2, in which the amount of surface-active glyceride is from 40 to 70% by weight, based on the weight of the composition.

4. A composition as claimed in claim 1, which additionally contains a non-foaming emulsifier or antifoam agent.

5. A composition as claimed in claim 1, in which the dyeing assistant is a phenoxyalkanol where the benzene ring is substituted by one or two chlorine atoms.

6. A composition as claimed in claim 5, in which the dyeing assistant is 2,4-dichlorophenoxypropanol.

7. A composition as claimed in claim 1, in which the surface-active glyceride is one produced by oxidation of a polyunsaturated oil followed by treatment with an alkali metal salt of an oxyacid of sulphur.

8. A composition as claimed in claim 7, in which the polyunsaturated oil is oiticica oil, tung oil, china wood oil or an oil derived from aquatic flora and fauna.

9. A composition as claimed in claim 8, in which the polyunsaturated oil is selected from oiticica oil, tung oil and fish oils, 10. A process for the substantially crease-free dyeing of polyester fibres which comprises contacting the fibres with a dyebath containing a disperse dye in the presence of a non-foaming composition comprising a dyeing assistant, which is a phenoxy alkanol where the benzene ring is substituted by one or two chlorine atoms and a surface-active glyceride which is one produced by oxidation of a polyunsaturated oil followed by treatment with an alkali metal salt of an oxyacid of sulphur.

* * * * *